United States Patent [19]

Falco

[11] Patent Number: 4,707,008
[45] Date of Patent: Nov. 17, 1987

[54] PORTABLE MULTIPOSITIONABLE LOCKING BODY MOLDING FOR FERROUS AND NON-FERROUS VEHICLES

[76] Inventor: Ted Falco, 13943 Biscayne Blvd., North Miami Beach, Fla. 33181

[21] Appl. No.: 861,598
[22] Filed: May 9, 1986
[51] Int. Cl.⁴ .............................................. B60R 13/02
[52] U.S. Cl. ...................................... 293/128; 428/31; 428/99; 428/900; 52/716
[58] Field of Search .......................... 428/31, 99, 900; 293/128; 52/716

[56] References Cited

U.S. PATENT DOCUMENTS 2,734,765  2/1956  Henderson et al. ............... 428/31 X
3,582,134  6/1971  Shaff ................................ 293/128 X
4,498,697  2/1985  McGlone et al. .................... 293/128

Primary Examiner—Alexander S. Thomas
Attorney, Agent, or Firm—Richard S. Ross

[57] ABSTRACT

Disclosed is a molded or extruded material made of plastic or rubber which forms the exterior portion of the body molding which can come in contact with other objects. On the underside portion of the body molding, vinylized magnets and suction cups are attached such that the body molding can be releasably attached to a ferrous or non-ferrous vehicle. The molding is sufficient in length and width to adequately protect a selected portion of the vehicle. Locking device mechanisms are recessed within the underside portion of the body molding which, when affixed to the jam of a door on a vehicle, prevent theft of the body molding while it is attached to the side of the vehicle.

12 Claims, 7 Drawing Figures

PORTABLE MULTIPOSITIONABLE LOCKING BODY MOLDING FOR FERROUS AND NON-FERROUS VEHICLES

FIELD OF THE INVENTION

This invention relates to portable body side molding for ferrous and non-ferrous vehicles. More particularly, this invention relates to a portable body side molding which may be releasably secured onto the side of a ferrous or non-ferrous vehicle by means of a secured recessed locking device.

BACKGROUND OF THE INVENTION

As the cost of vehicles has steadily increased throughout the years, vehicle owners have spent a great deal of time and money in maintaining the aesthetic beauty of the exterior portions of their vehicles. One problem such vehicle owners have, however, is the inability to protect the sides of the vehicle from dents and scratches caused by accidental contact, especially while the vehicle is parked in a packing lot. An example of such contact occurs when another vehicle owner opens his or her car door against the side of an owner's vehicle thereby causing a dent and/or a scratch to the vehicle's exterior. Although some vehicles are manufactured with a permanently affixed body side molding to the side of the vehicle, that molding often is not in the proper location to prevent accidental contact from another vehicle door or other object.

In light of this difficulty, it would be preferential to be able to locate and relocate the position of the body side molding situationally. This is true whether or not one owns a vehicle made of metal or, further, a non-ferrous vehicle made of, perhaps, fiberglass.

In the past, people have devised detachable body side moldings for ferrous vehicles. However, numerous problems still arise which are not dealt with regarding these devices. For example, such devices for ferrous vehicles are wholly inadequate for non-ferrous fiberglass body vehicles as vinyl magnets do not adhere to a non-metallic surface. Additionally, after an accident, the damaged portion of the ferrous vehicle is repaired with non-metallic material such that the vehicle loses its ferrous characteristic. Further, while one prior art reference, U.S. Pat. No. 4,498,697, proposes a non-integrated locking magnetic body molding, it may be easily stolen by simply bending the wire locking device. For all the other prior art, no locking devices are provided to prevent theft of the body molding.

All the above problems are overcome by the present invention in that the present invention incorporates a body side molding which can be releasably attached to ferrous and non-ferrous vehicles. Further, an inventive integrated recessed locking device is incorporated within the body side molding thus preventing theft of the body molding unit.

SUMMARY OF THE INVENTION

A typical embodiment of the present invention discloses a molded or extruded material made of plastic or rubber which forms the exterior portion of the body molding. The underside portion of the body molding is hollowed-out except for vinylized magnet posts and suction cup cylinder stands. The vinylized magnets and suction cups are attached such that the body molding can be releasably attached to a ferrous or non-ferrous vehicle. The molding is sufficient in length and width to adequately protect a selected portion of the vehicle. Locking device mechanisms are recessed within the underside portion of the body molding which, when affixed to the jam of a door on a vehicle, prevent theft of the body molding while it is attached to the side of the vehicle.

Figure 1:
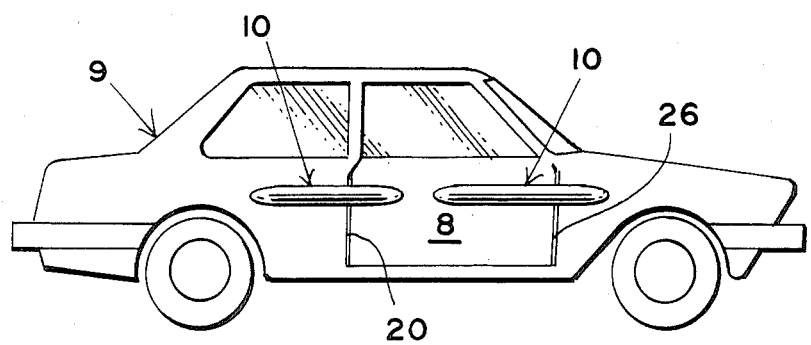
FIG. 1 is a side view of an automobile showing the invention attached to the door area.
Figure 2:
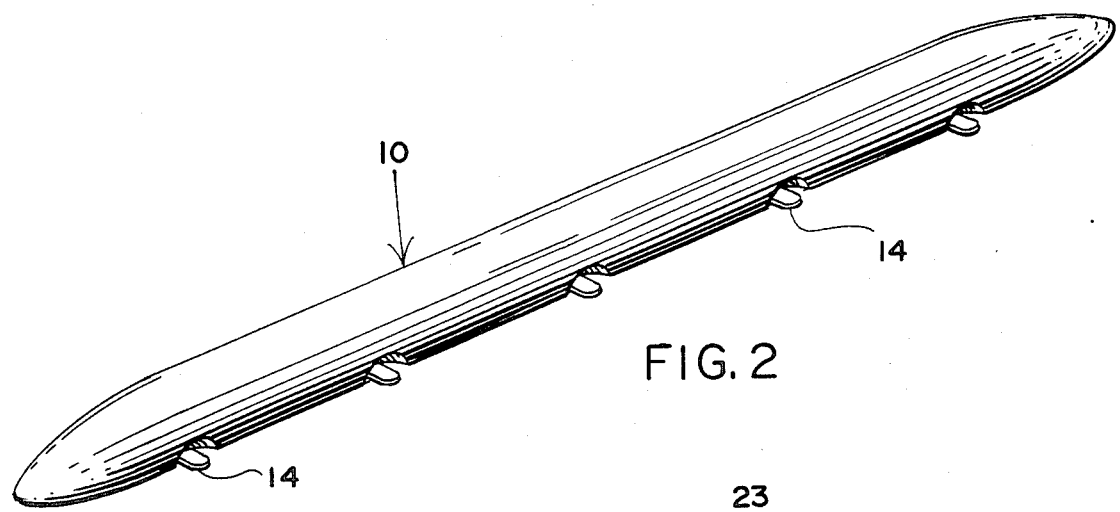
FIG. 2 is a perspective view showing the style of the design of the invention with exposed suction cup tabs.

DETAILED DESCRIPTION OF A PREFERRED EMBODIMENT:

As it may be seen in FIG. 1, a body molding 10 is attached to the side of a vehicle 9 at the door jam 20 by pressing with ones hand the body molding 10 to the side of the vehicle 9. It may be further seen in FIG. 1 that the body molding 10 can be attached at one end of the body molding 10 so as to protect a larger area of a separated portion of the vehicle such as a door 8 on vehicle 9 or may be attached to the door jam 20 at the middle of the body molding 10 so as to protect two distinct areas of the side of a vehicle 9.

Figure 3:
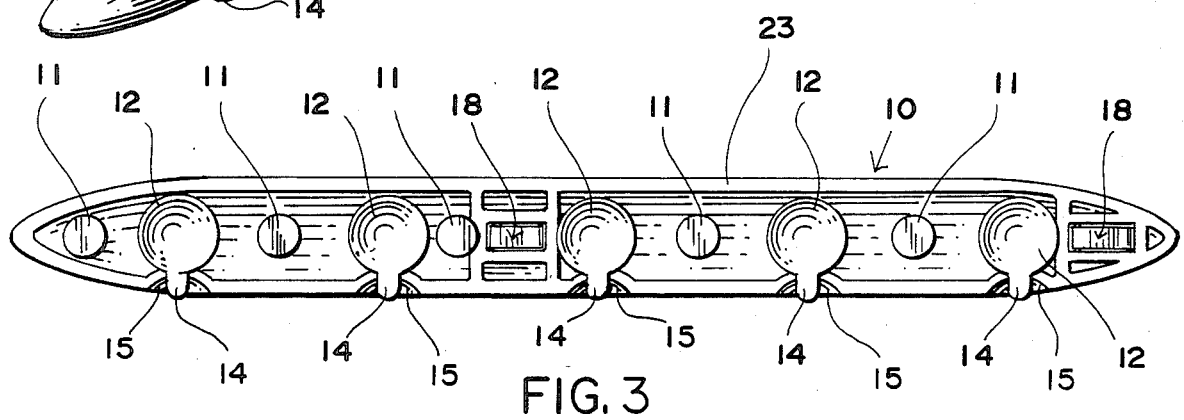
FIG. 3 is a bottom view of the invention.
Figure 4:
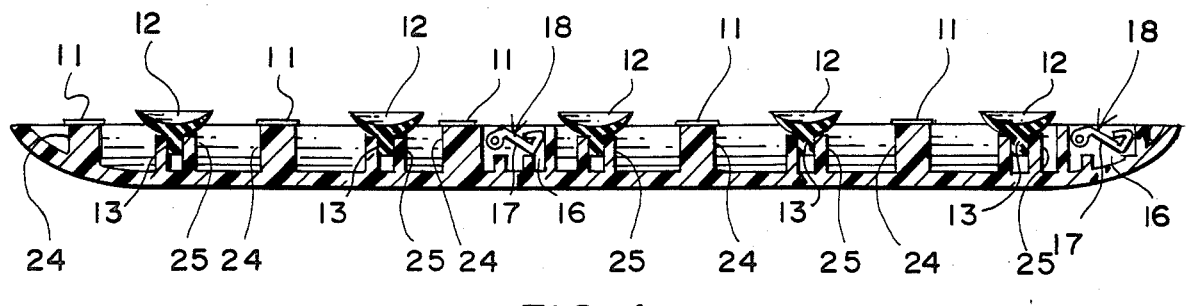
FIG. 4 is a longitudinal cross-section view of the invention.

The underside 23 of the body molding 10 as seen in FIGS. 3 and 4 show a plurality of circular vinylized magnets 11 adhesively attached to magnet posts 24 of the body molding 10. While circular vinylized magnets 11 are shown as preferred, the circular design of the vinylized magnet 11 may be altered to teach another embodiment. The magnet posts 24 extend perpendicularly from the underside 23 of body molding 10 such that magnets 11 can engage the vehicle 9. Suction cups 12 are permanently affixed to the suction cup cylinder stands 25 of the body molding 10 at the stem 13 such that each stem 13 is inserted into each suction cup cylinder stand 25 as shown in FIG. 4 by means of glue. The suction cups 12, situated perpendicularly from the underside 23 of body molding 10 to a point where they can engage the vehicle 9, provide for a means to releasably attach the body molding to a non-ferrous vehicle. A suction cup tab 14 is positioned accessibly to an individual at the finger groove 15 of the underside 23 of body molding 10 area such that the suction cup 12 may easily lose its suction pressure by pulling on the suction cup tab 14 with ones finger.

Figure 6:
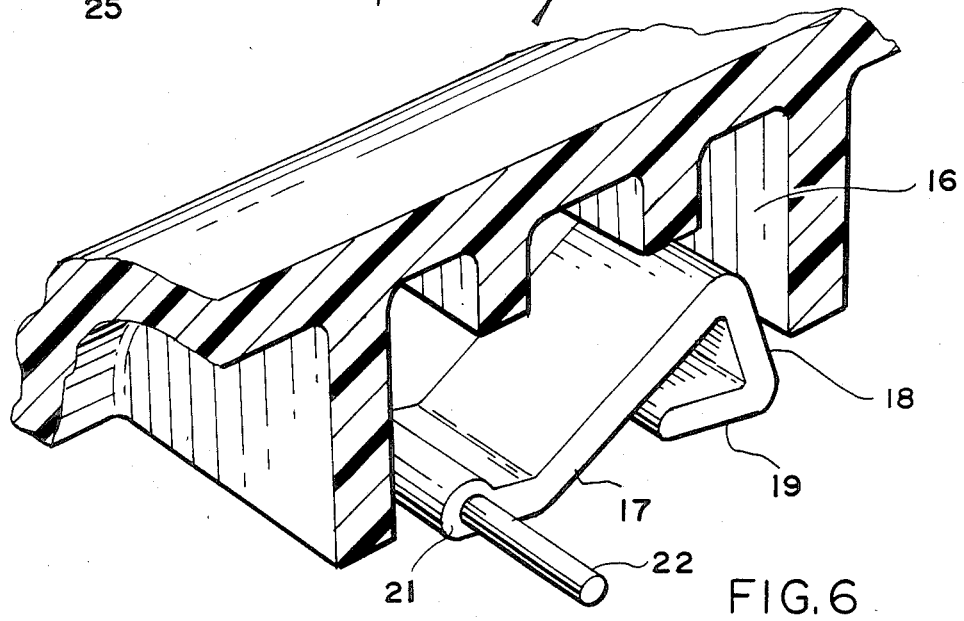
FIG. 6 shows a cross-section perspective view of the locking device.
Figure 7:
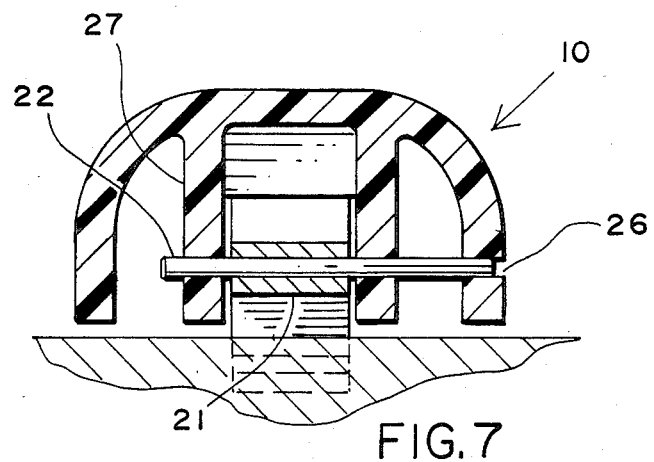
FIG. 7 shows a cross-section end view of the invention taken at the locking device.

In FIGS. 3 and 4, the underside 23 of the body molding 10 has a locking device housing 16. The locking device housing 16 has within it a recessed locking device 18 which is secured to the body molding 10 at its base 17. FIGS. 6 and 7 show the preferred embodiment of the locking device 18. The base 17 of the locking device 18 comprises a cylindrical sleeve 21 along its length. A pin 22 is inserted into the cylindrical sleeve 21 through the pin hole 26 of the body mold 10 and secured at one end to the opposite housing flange 27 at the other end to the body molding 10. The locking device 18 may be freely movable at its base 17 such that the locking device 18 can be easily engageable with a door jam 20 as is shown in FIG. 5 or recessed into the locking device housing 16 when not in use as shown in FIG. 4.

Figure 5:
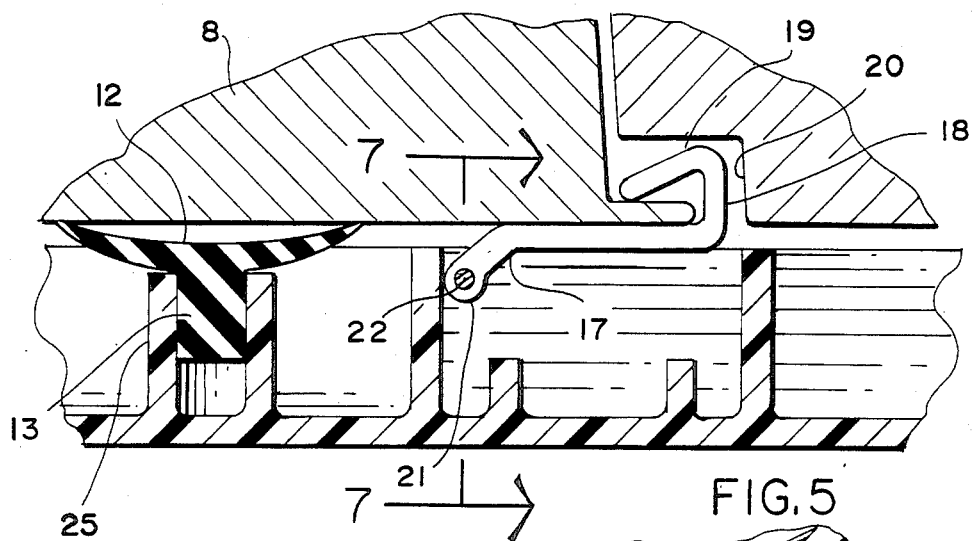
FIG. 5 is a view of the locking device engaging a door jam.

Further, FIG. 5 shows a more detailed description of the locking device 18. The locking device 18 is shaped in a bent semi-U block form such that the door jam 20 may easily fit in the interior portion of the bent U receptacle and engage the locking device flange 19 of the locking device 18. Such an engagement prevents the door jam 20 from disengaging the locking device 18 unless the door frame of the vehicle 9 is open, thus preventing theft of the body molding 10. In order to prevent scratching of the vehicle's 9 paint, the locking device 18 discloses a rubber coated metal locking device 18. Another embodiment, however, teaches a hard plastic or solid rubber locking device 18.

Although the above-stated description entails a preferred embodiment of the invention, any device which incorporates the same function of the invention so as to produce same or similar device is herein anticipated by this invention.

What is claimed is:

1. A portable multi-positionable locking body molding for a ferrous or non-ferrous vehicle comprising, in combination:
   an elliptical body molding,
   said body molding having a generally hollowed out underside,
   said underside having a plurality of magnet posts situated perpendicular to said underside,
   said underside having a plurality of suction cup cylinder stands situated perpendicular to said underside,
   a plurality of vinylized magnets such that said magnets are adhesively attached to the top of said magnet posts on the underside of said body molding,
   a plurality of suction cups having suction cup stems such that said suction cup stems are adhesively attached, and insertable into each situation cup cylinder stand to the underside of said body molding,
   a plurality of locking device housings,
   a plurality of locking devices, said locking devices being integrally relates with said body molding and attached by means of a pin to the underside of the body molding which is recessed within said locking device housing of the said body molding.

2. In the locking body molding of claim 1, said suction cups having suction cup tabs attached to the edge of said suction cups.

3. In the locking body molding of claim 2, said body molding having a plurality of finger grooves at the underside of said body molding such that said finger grooves are positioned to accessibly receive the suction cup tabs of said suction cups.

4. In the locking body molding of claim 1, said suction cup stems are adhesively attached into each suction cup cylinder stand by means of glue.

5. In the locking body molding of claim 1, said vinylized magnets are adhesively attached to the end of said magnet posts by means of glue.

6. In the locking body molding of claim 1, said magnet posts and said suction cup cylinder stands alternate.

7. A portable multi-positionable locking body molding for a ferrous or non-ferrous vehicle comprising, in combination:
   an elliptical body molding,
   said body molding having a generally hollowed out underside,
   said underside having a plurality of magnet posts situated perpendicular to said underside,
   said underside having a plurality of suction cup cylinder stands situated perpendicular to said underside,
   a plurality of vinylized magnets such that said magnets are adhesively attached to the top of said magnet posts on the underside of said body molding,
   a plurality of suction cups having suction cup stems such that said suction cup stems are adhesively attached and insertable into each suction cup cylinder stand to the underside of said body molding,
   a plurality of locking device housings,
   a plurality of locking devices, said locking devices being integrally related with said body molding and attached by means of a pin to the underside of the body molding which is recessed within said locking device housing of the said body molding, said locking device being shaped in a bent semi-U block form such that the exterior top portion end of the shorter leg of the bent semi-U block form is angled downward to snugly and securely fit the edge or jam of a vehicle door or panel to prevent theft.

8. In the locking body molding of claim 7, said locking device base having a cylindrical sleeve along its length such that said pin can engage said sleeve.

9. In the locking body molding of claim 7, said pin is permanently and integrally secured to said body molding at one end through a pin hole and is integrally secured at its other end to the housing flange further away from said pin hole and is further secured within the recessed portion of said locking device housing.

10. In the body molding of claim 7, said locking device is made of a metal material and coated in plastic or rubber.

11. In the locking body molding of claim 7, said locking device is made of plastic or rubber.

12. In the locking body molding of claim 7, said molding having two locking devices and two locking device housings.

* * * * *